US007676625B2

(12) United States Patent
Cassiday et al.

(10) Patent No.: US 7,676,625 B2
(45) Date of Patent: Mar. 9, 2010

(54) CROSS-COUPLED PERIPHERAL COMPONENT INTERCONNECT EXPRESS SWITCH

(75) Inventors: Daniel R. Cassiday, Topsfield, MA (US); Andrew W. Wilson, Fremont, CA (US); John Acton, Danville, CA (US); Charles Binford, Wichita, KS (US); Raymond J. Lanza, Nashua, NH (US)

(73) Assignee: Sun Microsystems, Inc., Santa Clara, CA (US)

( * ) Notice: Subject to any disclaimer, the term of this patent is extended or adjusted under 35 U.S.C. 154(b) by 220 days.

(21) Appl. No.: 11/466,734

(22) Filed: Aug. 23, 2006

(65) Prior Publication Data
US 2008/0052443 A1 Feb. 28, 2008

(51) Int. Cl.
G06F 13/00 (2006.01)
(52) U.S. Cl. .............. 710/316; 710/317; 710/305; 710/306
(58) Field of Classification Search ......... 710/316–317, 710/4, 107, 100, 301–306, 312, 104, 52; 345/502
See application file for complete search history.

(56) References Cited

U.S. PATENT DOCUMENTS

| 5,841,775 | A | 11/1998 | Huang |
| 6,631,436 | B1 | 10/2003 | Liu et al. |
| 7,046,668 | B2 | 5/2006 | Pettey et al. |
| 7,058,738 | B2 | 6/2006 | Stufflebeam, Jr. |
| 7,088,727 | B1 | 8/2006 | Short et al. |
| 2005/0117578 | A1* | 6/2005 | Stewart et al. ............. 370/389 |
| 2005/0246460 | A1* | 11/2005 | Stufflebeam, Jr. ........... 710/104 |
| 2006/0282603 | A1* | 12/2006 | Onufryk et al. ............. 710/312 |
| 2007/0139423 | A1* | 6/2007 | Kong et al. ................. 345/502 |
| 2007/0198763 | A1* | 8/2007 | Suzuki et al. ............... 710/316 |

OTHER PUBLICATIONS

Kazmi, Akber, "PCI Express and Non-Transparent Bridging Support High Availability," Nov. 20, 2004, Embedded Computing Design, http://web.archive.org/web/20041120123502/http://www.embedded-computing.com/articles/kazmi/.

* cited by examiner

Primary Examiner—Mark Rinehart
Assistant Examiner—Kim T Huynh
(74) Attorney, Agent, or Firm—Marsh Fischmann & Breyfogle LLP; Bobby Soltani; Kent A. Lembke

(57) ABSTRACT

A plurality of PCIe switch complexes are interposed between a plurality of I/O devices and a plurality of microprocessor complexes. Each PCIe switching complex comprises a plurality of PCIe switches wherein each switch possesses at least one non-transparent port. The non-transparent port is used to cross-couple each PCIe switch creating an active matrix of paths between the HBAs associated with each I/O device and each microprocessor. The paths between each HBA (I/O device) and each microprocessor are mapped using a recursive algorithm providing each I/O device with direct memory access to each microprocessor.

20 Claims, 7 Drawing Sheets

CROSS-COUPLED PERIPHERAL COMPONENT INTERCONNECT EXPRESS SWITCH

RELATED APPLICATIONS

The present application relates to U.S. patent application Ser. No. 11/466,729 filed on Aug. 23, 2006 entitled, "Input/Output Routers With Dual Internal Ports" and U.S. patent application Ser. No. 11/466,726 filed on Aug. 23, 2006 entitled, "Data Buffer Allocation in a Non-blocking Data Services Platform using Input/Output Switching Fabric". The entirety of both applications is hereby incorporated by this reference.

BACKGROUND OF THE INVENTION

1. Field of the Invention

Embodiments of the present invention relate, in general, to cross-coupling Peripheral Component Interconnect express ("PCIe") switches and particularly to cross-coupling PCIe switches using non-transparent PCIe switch ports.

2. Relevant Background

Typical current computer system configurations consist of one or more processor and Input/Output ("I/O") complexes connected through internal high speed busses. This connection occurs via I/O adapter cards, commonly termed Host Bus Adapters (HBAs) or Network Interface Cards (NICs). The highest performance systems, as is currently known in the art, use a PCI express bus as the interface to a HBA or NIC bus, as shown in FIG. 1.

Microprocessor complexes in many such systems provide several I/O busses, which may either be connected directly to an HBA, or connected to several HBAs through an I/O switch. The collection of busses and switches is often termed an I/O switching fabric or complex. As illustrated in FIG. 1, a PCIe switch 110 forms, in one example, a tree of devices owned by one microprocessor (CPU) complex 120 at the root of the tree. The microprocessor complex 120 of FIG. 1 is connected directly to a single HBA 130 as well as the PCIe switch 110 which is in turn coupled to two other HBA devices 140, 150 and a NIC 160, the NIC 160 providing access to a network 170. Two arrays 180, 190 are connected to the microprocessor complex 120 via the PCIe switch 110/HBA 140 path or directly through a single HBA 130. Currently, no mechanism exists with standard PCI devices and switches to share a device with multiple CPU complexes.

Microprocessor complexes and devices in two PCI trees can talk to each other using a non-transparent bridge. Such a bridge consists of two ports, both of which appear to be PCI leaf devices. As a PCI device, they respond to specific, programmable address ranges. Unlike normal devices, when they detect a PCI transaction in their address range, they pass the transaction on to the other port, after adding or subtracting an address offset, and essentially place the request on the other PCI tree. This allows hosts and devices in one tree to access memory locations and device registers in the other tree.

Non-transparent bridges, as is known in the prior art, can also be built directly into ports of PCIe switches, as illustrated in FIG. 2. As shown in FIG. 2, a multi-port PCIe switch 210, associated with a first microprocessor complex 220, is shown with one non-transparent port 230 connected to a second microprocessor complex 240. This allows both microprocessor complexes 220, 240 to access the registers and memory on the I/O devices 250, and allows the I/O devices 250 to access the main memories in both microprocessor complexes 220, 240. However, in this example, all I/O devices 250 are controlled by the first microprocessor complex's 220 operating system. This can result in placing an excessive workload on the first microprocessor complex, and leaves the system vulnerable to the failure of the first microprocessor complex. If the first microprocessor complex does fail, the second microprocessor complex 240 can reprogram the switch 210 to move the non-transparent port to the second microprocessor complex 240 effectively giving it control and allowing processing to resume after a brief pause.

Each of the I/O devices 250 controlled by the first microprocessor complex 220 can access the memory of either microprocessor complex 220, 240 through an access address. For example, assume each microprocessor complex 220, 240 has one Gigabyte (1 GB) of main memory, addressed from location zero. The non-transparent port 230 can be configured to pass all addresses below 1 GB to the first microprocessor complex 220, and to pass all addresses above 1 GB to the second microprocessor complex 240, after first subtracting 1 GB from the address. Thus both microprocessor complexes 220, 240 see addresses in the correct range, and the second microprocessor complex 240 does not need to be aware that the requests originated with a different address range.

As many computer systems, and the storage devices connected to them, are expected to maintain a very high state of availability, it is typically expected that the systems continue to run even when a component fails. The current approach to achieving high availability is to provide redundant components and paths. One way to achieve this in a storage subsystem is to provide each device and host with at least two ports, and provide each with at least two storage switches such as a Fibre-Channel Switch.

An example using a Fibre-Channel ("FC") as an array interconnect, as is known in the prior art, is shown in FIG. 3. Note that each host 310, 320 has two paths to each array 350, 360, so when a switch or FC cable becomes inoperative, the affected host can still communicate with the array or arrays over the other path or paths. The traditional redundant array and switch approach uses alternate paths to provide high storage availability. As configured, it is possible for both hosts to access both arrays, so when provisions are made to store data redundantly on the arrays then the system can continue to operate even when an array fails, and when appropriate software and network connections (not shown) are installed on the hosts 310, 320, the basic applications may continue to run even when one host fails. This approach to high availability is widely used in the computer industry.

As is known in the prior art, other operations along with the switching, such as file services or storage virtualization are often desired. In those cases the switches are replaced by storage processors, and often combined into what is commonly referred to as a storage appliance. Within a storage appliance, it is still necessary to have at least two independent storage processors in order to achieve high availability. The storage processors typically run separate instances of an operating system or other code. Typically, there is also a pair of inter-processor links which provides communication between the processors. These links can optionally include switches and additional links to additional storage processors for capacity expansion.

For a number of reasons many of the offered I/O requests and associated data may have to be processed by two or more storage processors and hence travel across the inter-processor links. This can occur with larger configurations because a given host and array may not be connected to the same set of storage processors. Even if they are, requests still may have to be forwarded across the inter-processor links because the other storage processor must participate in the operation.

Just as cross-coupling hosts, switches and storage devices can increase capacity and provide higher availability in a FC storage network, so can cross-coupling switches within a multi-processor. Multistage switching allows capacity expansion by adding extra columns and rows to the switch matrix. If link bandwidth utilization is well balanced you can achieve a near linear increase in total system bandwidth as you increase the system size, at a significant savings in switch elements over those required by a full crossbar switch.

As shown in FIG. 4, by adding an extra stage (row) of switches, a second path can be created between each microprocessor 410 and each memory device 440. These redundant paths provide the benefits of improved availability and traffic spreading. Careful examination of FIG. 4 will reveal that all combinations of any microprocessor 410 and any memory device 440 access, have two independent paths through the switch matrix 450, allowing full connectivity to continue even if one switch fails.

Each of the aforementioned techniques however, possesses significant drawbacks. While each of the previously described techniques provide access to all of the attached devices, the access is not equal, balanced, or independent. Hosts, or microprocessor complexes, of the systems previously described expect to have exclusive control of the drives to which they have access, thus in a large computing environment having multiple hosts, cross connectivity results in hosts fighting over which host owns and controls the data on any one particular device. These and other problems are addressed by embodiments of the present invention as described by example in the following detailed description.

SUMMARY OF THE INVENTION

Briefly stated, embodiments of the present invention disclose a system of PCIe switches configured in a cross-coupled complex so as to provide a plurality of I/O devices with multiple paths of access to a plurality of microprocessor complexes. A plurality of PCIe switches are cross-coupled via each switch's non-transparent port. The non-transparent ports are actively used by the HBAs to provide each I/O device with direct memory access to each microprocessor complex. Rather than using the non-transparent port as a failover system, one embodiment of the present invention combines the cross-coupling of PCIe switches with a recursive address map to efficiently provide each I/O with direct memory access. Thus, according to one embodiment of the present invention switches, cross-coupled via non-transparent ports, provide multiple communication paths between each HBA and each microprocessor complex. Furthermore, ownership of the HBAs is distributed across the microprocessor complexes.

According to one aspect of the present invention a plurality of PCIe switch complexes are interposed between a plurality of I/O devices and a plurality of microprocessor complexes. Each PCIe switching complex comprises a plurality of PCIe switches wherein each switch possesses at least one non-transparent port. The non-transparent port is used to cross-couple each PCIe switch creating a matrix of paths between the HBAs associated with each I/O device and each microprocessor. The paths between each HBA (I/O device) and each microprocessor are mapped using a recursive algorithm providing each I/O device with direct memory access to each microprocessor.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter. Accordingly, resort to the claims to determine such inventive subject matter.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

A switching complex comprised of PCIe switches cross-coupled via non-transparent ports provides I/O devices with independent and substantially equal access to multiple microprocessors. A plurality of I/O devices is associated with the PCIe switching complex through sets of host bus adapters. Each set of host bus adapters includes at least one host bus adapter that is associated with each I/O device. The host bus adapter is in turn associated with the switching complex through PCIe switches. Each PCIe switch in the switching complex is cross-coupled with either another PCIe switch in the complex via the PCIe switch's non-transparent port, or with a microprocessor complex. Balanced and independent access between each I/O device and each microprocessor is facilitated by employing a recursive addressing scheme producing a static map of address ranges for each I/O-PCIe switch-microprocessor tree.

It is to be understood that although the switching complex is illustrated as a single entity, as the term is used herein, a PCIe switching complex refers to a collection of functionalities which can be implemented as software, hardware, firmware or any combination of these. Where the PCIe switching complex is implemented as software, it can be implemented as a standalone program, but can also be implemented in other ways, for example as part of a larger program, as a plurality of separate programs, as one or more device drivers or as one or more statically or dynamically linked libraries. A PCIe switching complex can also be instantiated on and/or as part of a server, client, proxy, and/or any combination of these and/or other computing devices and/or platforms.

Figure 1:
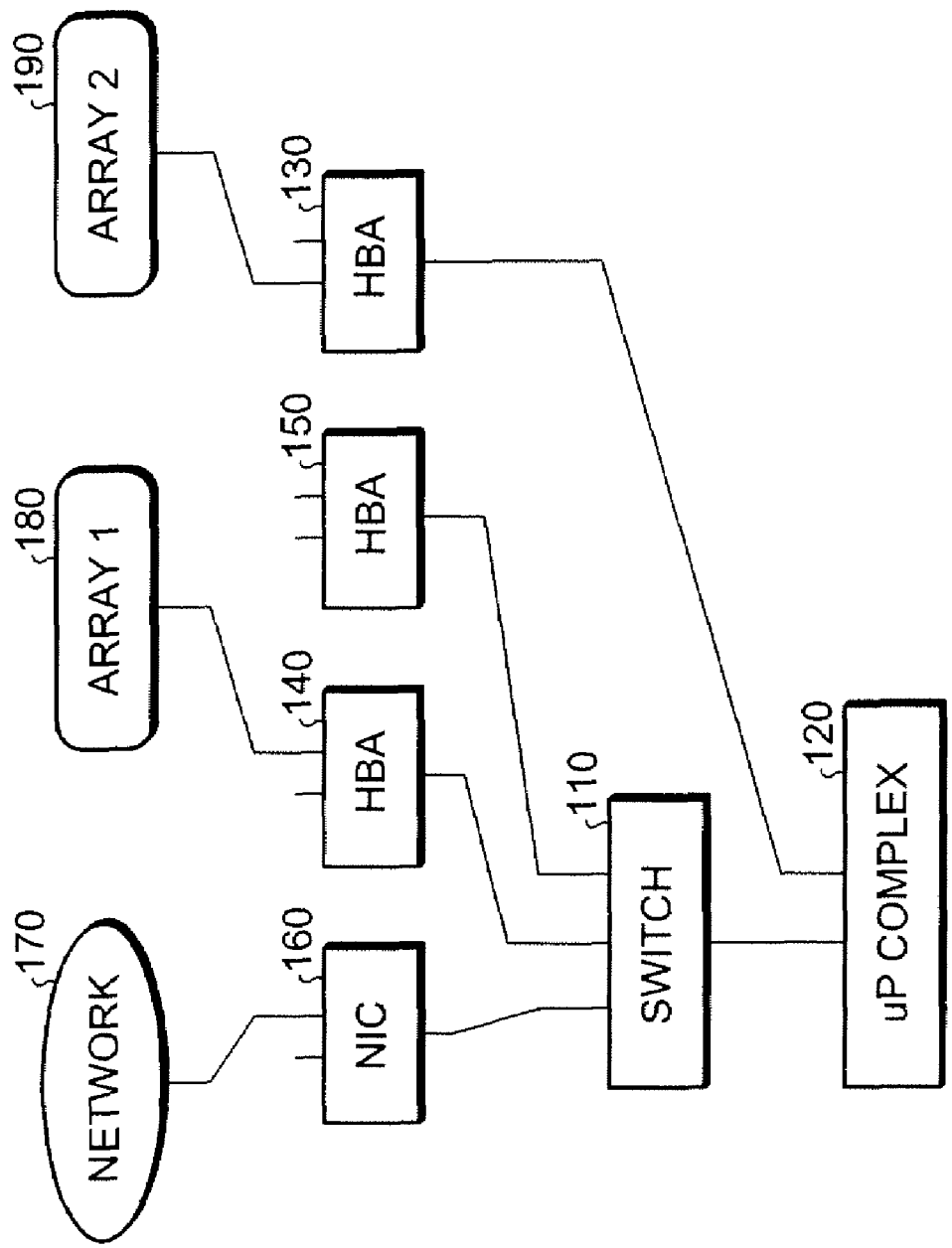
FIG. 1 shows a simple PCIe interconnect tree as is known in the prior art.
Figure 2:
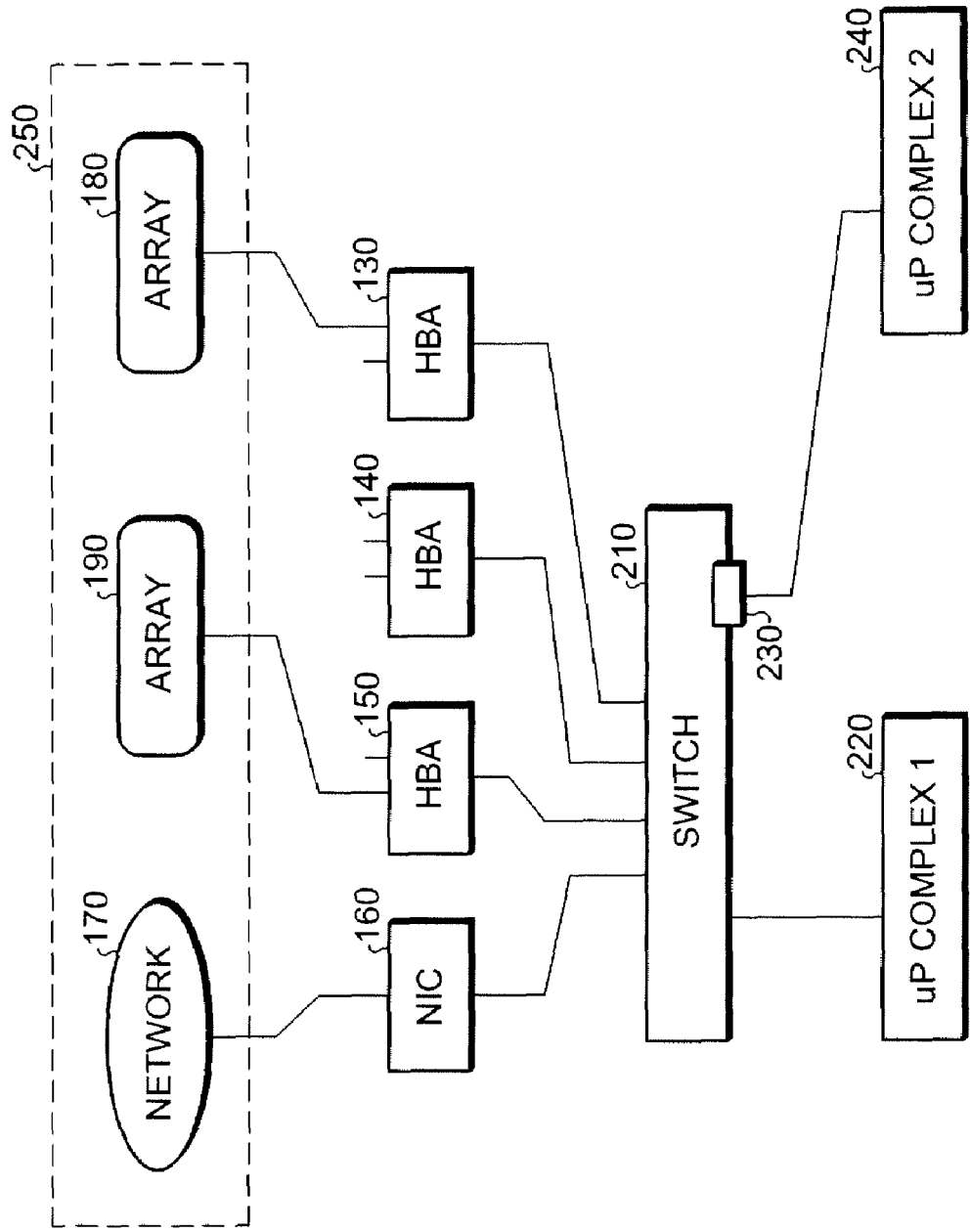
FIG. 2 shows sharing I/O devices between to microprocessor complexes using a PCIe switch with a non-transparent port as is known in the prior art.
Figure 3:
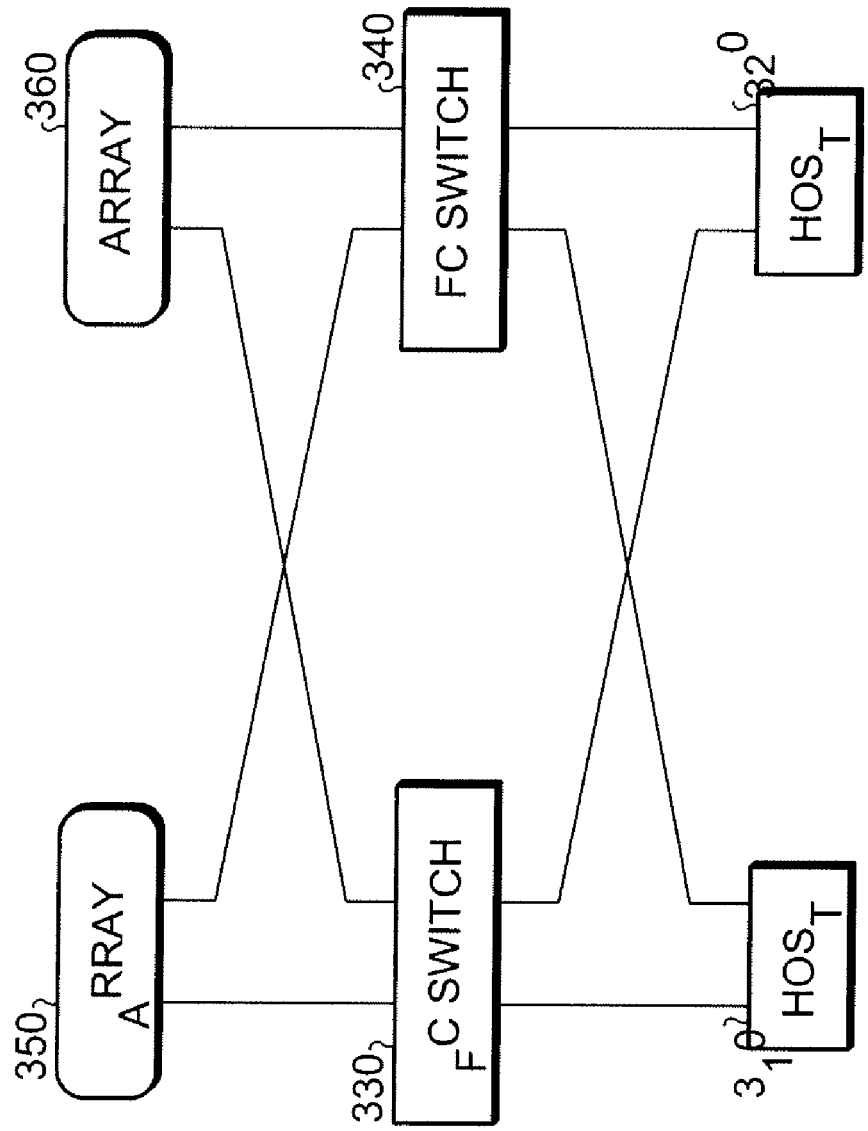
FIG. 3 shows a redundant high availability storage array using FC switches as is known in the prior art.
Figure 4:
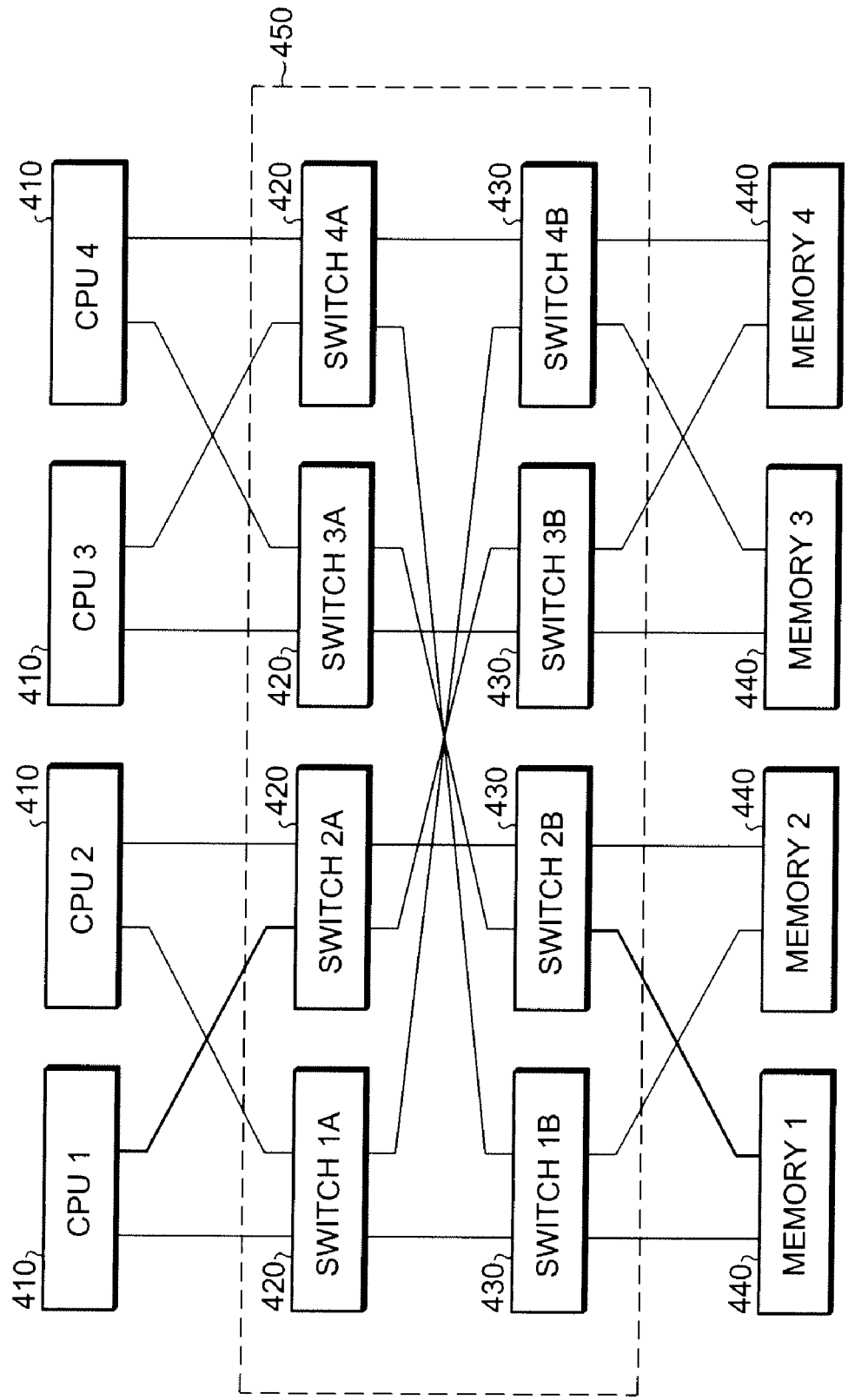
FIG. 4 shows a multistage switch matrix as is known in the prior art.
Figure 5:
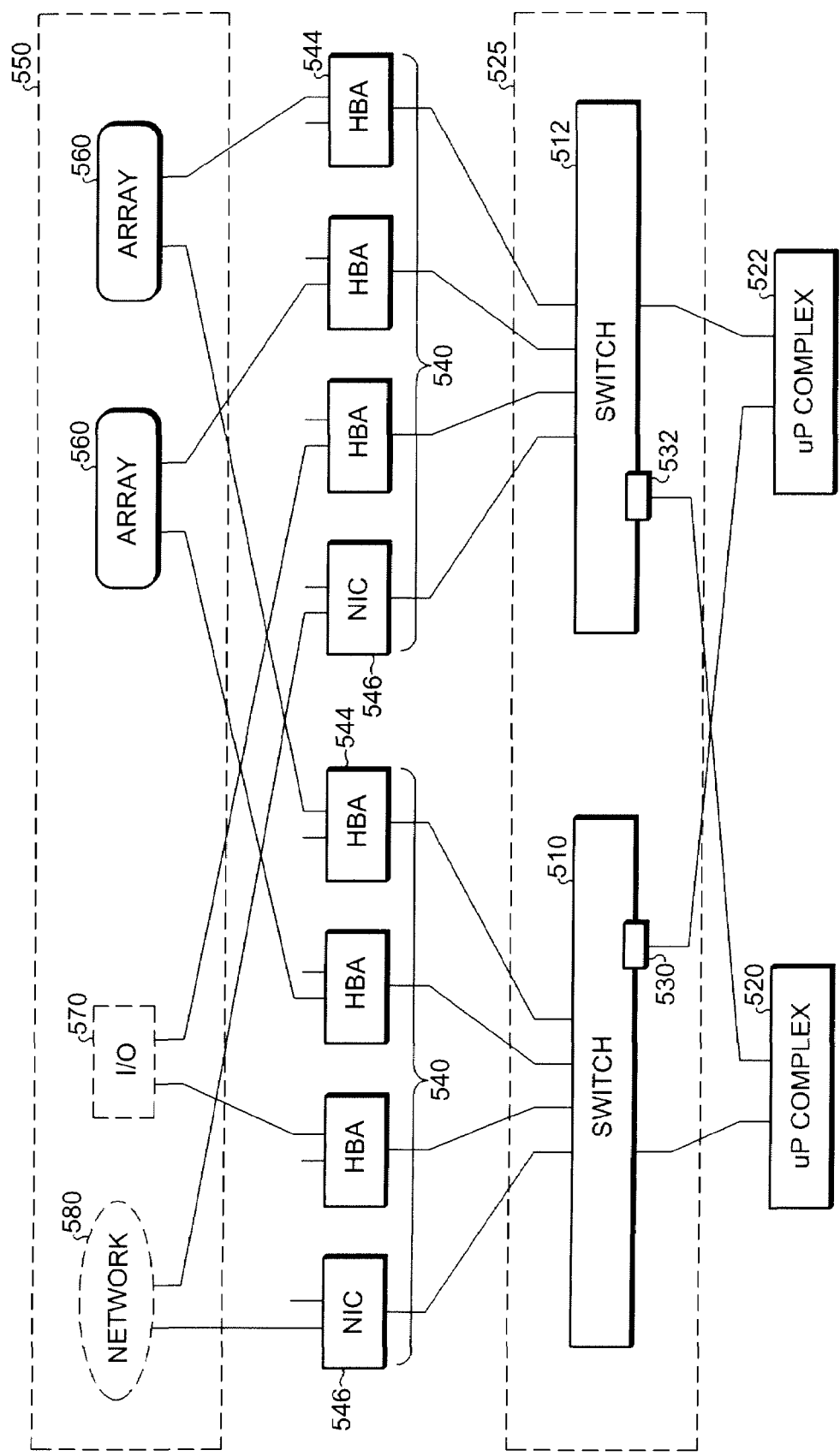
FIG. 5 shows a cross-coupled peripheral component interconnect express switch complex for independently coupling I/O devices to microprocessor complexes, according to one embodiment of the present invention.

FIG. 5 shows a cross-coupled peripheral component interconnect express switch complex for independently coupling I/O devices to a plurality of microprocessor complexes, according to one embodiment of the present invention. Multiple I/O devices 550 are associated with a switching complex 525 via a plurality of I/O adapter sets 540. Each I/O adapter set 540 includes several HBAs 544 or other I/O adapter cards such as a NIC 546. The I/O adapter sets 540 serve as an interface between one or more I/O devices in the complex 550 and the switching complex 525. As shown in FIG. 5, the I/O complex 550 is comprised of a plurality of I/O devices such as storage arrays 560 or other forms of data storage media, networks 580 such as the Internet or an Intranet, and any other type of I/O device 570 as is known to one skilled in the art. Each I/O device of the I/O complex 550 is coupled to at least two HBAs 544 for high availability configurations.

The switching complex 525, as shown in FIG. 5, is, in one exemplary embodiment of the present invention, comprised of two PCIe express switches 510, 512. Each switch 510, 512 is associated with an I/O adapter set 540 comprised of a plurality of HBAs 544/NICs 546. At least one HBA 544 associated with each switch 510, 512 is coupled to each I/O device in the I/O complex 550. For example a network 580 can be coupled to each switch 510 via a NIC 546 in each I/O adapter set 540. Each PCIe switch 510 is therefore in direct communication with the Network 580 through the NIC 546. Each switch possesses a port to the microprocessor complex 520, 522 to which it is associated with, or owned as is often termed in the art, as well as one or more non-transparent ports 530, 532 capable of coupling the PCIe switch 510, 512 to either a different microprocessor complex 522, 520 or, in other embodiments of the present invention, to other PCIe switches. The cross-coupling capability of the non-transparent ports 530, 532 provide a scalable means to provide each microprocessor complex 520, 522 with direct access to each I/O device and vice versa.

For example, if a file read request was received by the NIC 546 from the network 580 for data stored on an array 560, the data could be transferred from the array 560 to an HBA 544 associated with the array, then, in this example, over to a PCIe switch 512. Through the switch's non-transparent port 532 the data can be placed in a buffer in a microprocessor complex's 520 memory. Then, it can be transferred by the PCIe switch 510 associated with that microprocessor 520 to the NIC 546 and back to the requesting host, in this case the network 580. A similar sequence could happen for a block based request for the same data. In this case the I/O device 570 connected to one PCIe switch 510 might be used with the data otherwise following the same path. However, the alternate path through the switch's 510 transparent port 530 to another microprocessor complex 522 memory and then through its PCIe switch 512 to the appropriate HBA 544 could also be used, which would distribute the data traffic, increasing performance.

Figure 6:
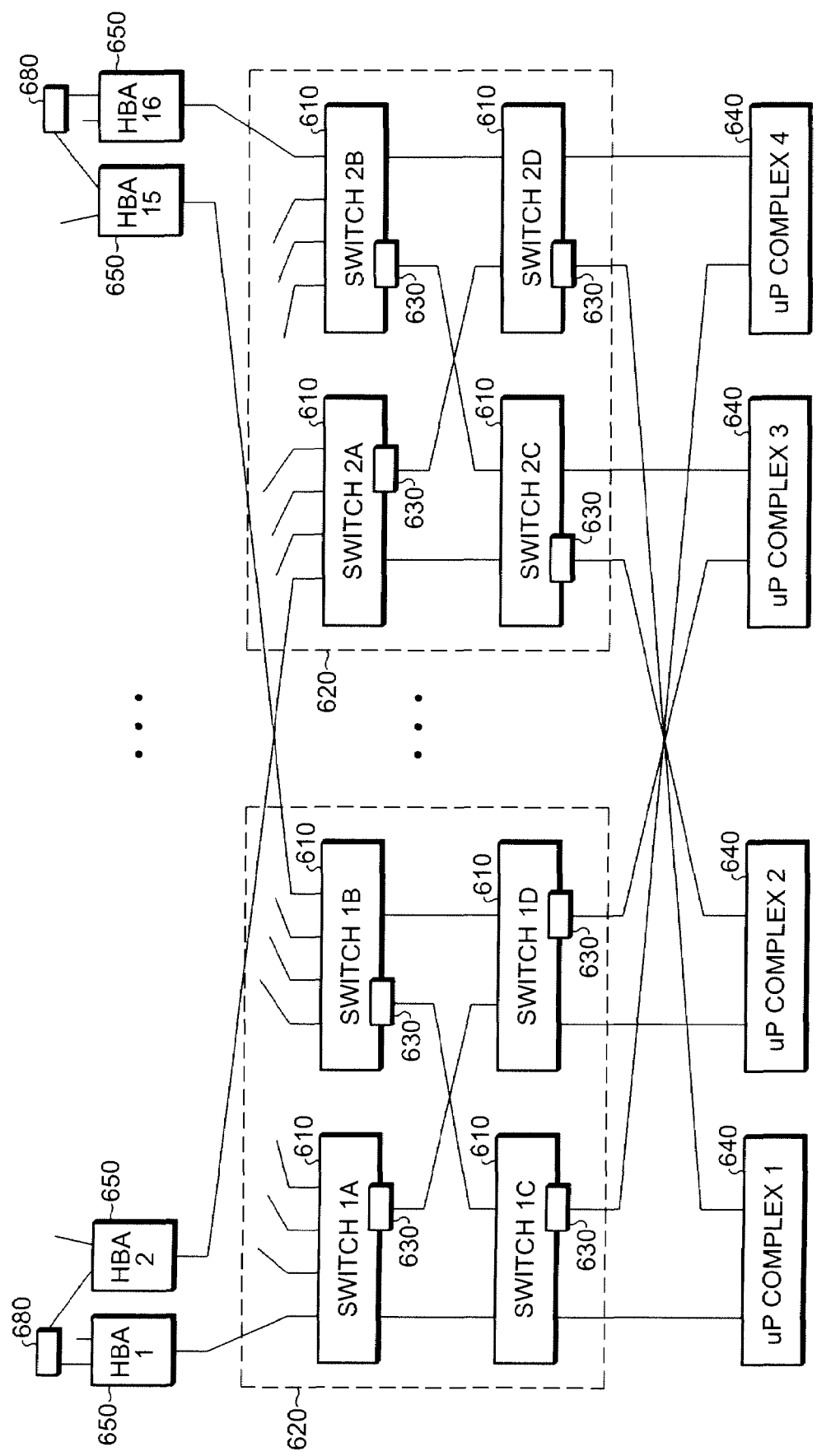
FIG. 6 shows multiple cross-coupled peripheral component interconnect express switch complexes independently connecting host bus adapters to microprocessor complexes, according to one embodiment of the present invention.

FIG. 6 shows, according to one embodiment of the present invention, an exemplary depiction of a scaled cross-coupled peripheral component interconnect express switch complex that independently couples I/O devices to a plurality of microprocessor complexes. As in FIG. 5, FIG. 6 shows a plurality of PCIe switches 610 that are cross-coupled to provide direct paths between each of a plurality of microprocessor complexes 640 to each of a plurality of I/O devices 680. FIG. 6 depicts two PCIe switch complexes 620, four microprocessor complexes 640 and 16 HBAs supporting a plurality of I/O devices 680. The scaled nature of the PCIe switch complexes allows each HBA to have balanced access to each microprocessor complex 640. By using the non-transparent port 630 of each PCIe switch 610, a direct path can be mapped between each HBA 650 and each microprocessor complex 640. Thus, the cross-coupling of the PCIe switches 610 enables the HBAs 650 to be able to communicate with all microprocessor complexes 640 and distribute ownership of the HBAs 650 across all of the microprocessor complexes 640.

In similar fashion, multiple microprocessor complexes 640 can be added in an increasing scaled PCIe switch complex 620 configuration. In so doing, alternate paths for data traffic can be established allowing load balancing to achieve improved performance. As a result of the non-transparent port PCIe switch cross-coupling, each processor complex can operate as an independent operating system domain to enhance availability while still allowing direct data transfer between an I/O device and any microprocessor complex. Furthermore, the alternate routing provides an increase measure reliability and redundancy. I/O ports can continue to operate after a microprocessor complex (card) fails. While other forms of redundancy exist, the novel cross-coupling of the PCIe switches using non-transparent ports allow failures to be compensated for with minimal down time and decreased latency.

To extend a simple address routing associated with a single stage switching complex to a multi-stage switch, a recursive application of address based routing must be applied. The algorithm to construct these address mappings proceeds from the microprocessor complexes themselves up through the PCIe switch matrix. For example, let the largest address range of any of the microprocessor complexes be 0 to M−1 bytes. Then the transparent port of each of the lowest level of PCIe switches will also be 0 to M−1 bytes, while the address range of the non-transparent ports will be M to 2M−1, with an offset of −M applied to the addresses of requests that map to the non-transparent port. Similarly, the next level of PCIe switches will have a transparent port range of 0 to 2M−1 bytes, and the non-transparent range will be 2M to 4M−1 with an offset of −2M. As with the lower PCIe switch level, the lowest 0 to M−1 addresses map to the microprocessor complex serving as the root complex of the PCIe tree which owns the PCIe switch, while the M to 4M−1 addresses all map to a non-transparent port at one or the other or both of the levels of the PCIe switch.

When "L" is defined as the level number of the PCIe switch, and with L=1 the level closest to the microprocessor complexes, then at each level thereafter the transparent port covers a range of 0 to L*M−1, while the non-transparent port covers a range of L*M to 2*L*M−1, with an offset of −L*M. Based on these assignments and the actual PCIe switch connectivity, a static map of address ranges to microprocessor complexes can be produced for each PCIe switch tree. Then, when setting up an HBA (I/O device) to microprocessor complex direct memory access transfer, the destination and owning microprocessor complex numbers are simply used to index a table of direct memory access address offsets that are added to the local address of the allocated buffers. Table 1 shows the configuration shown in FIG. 5.

TABLE 1

Table of Address offsets for two level PCIe switch configuration.

| Owner Cplx | Destination Cplx | | | |
|---|---|---|---|---|
| | 1 | 2 | 3 | 4 |
| 1 | 0 | 2M | 3M | 1M |
| 2 | 2M | 0 | 1M | 3M |
| 3 | 3M | 1M | 0 | 2M |
| 4 | 1M | 3M | 2M | 0 |

Thus, using the techniques discussed here, an address mapping table can easily be developed for any size cross-coupled system of PCIe switches with non-transparent ports. In one embodiment, the tables would be derived during boot up with relevant information programmed into the switches at that time. In another embodiment of the present invention, the information would be saved for each microprocessor complex, so it could immediately translate a destination complex plus local memory address into the correct offset memory address for that complex's devices, thus enabling efficient and rapid communication from any I/O device to any processor complex in the system.

Figure 7:
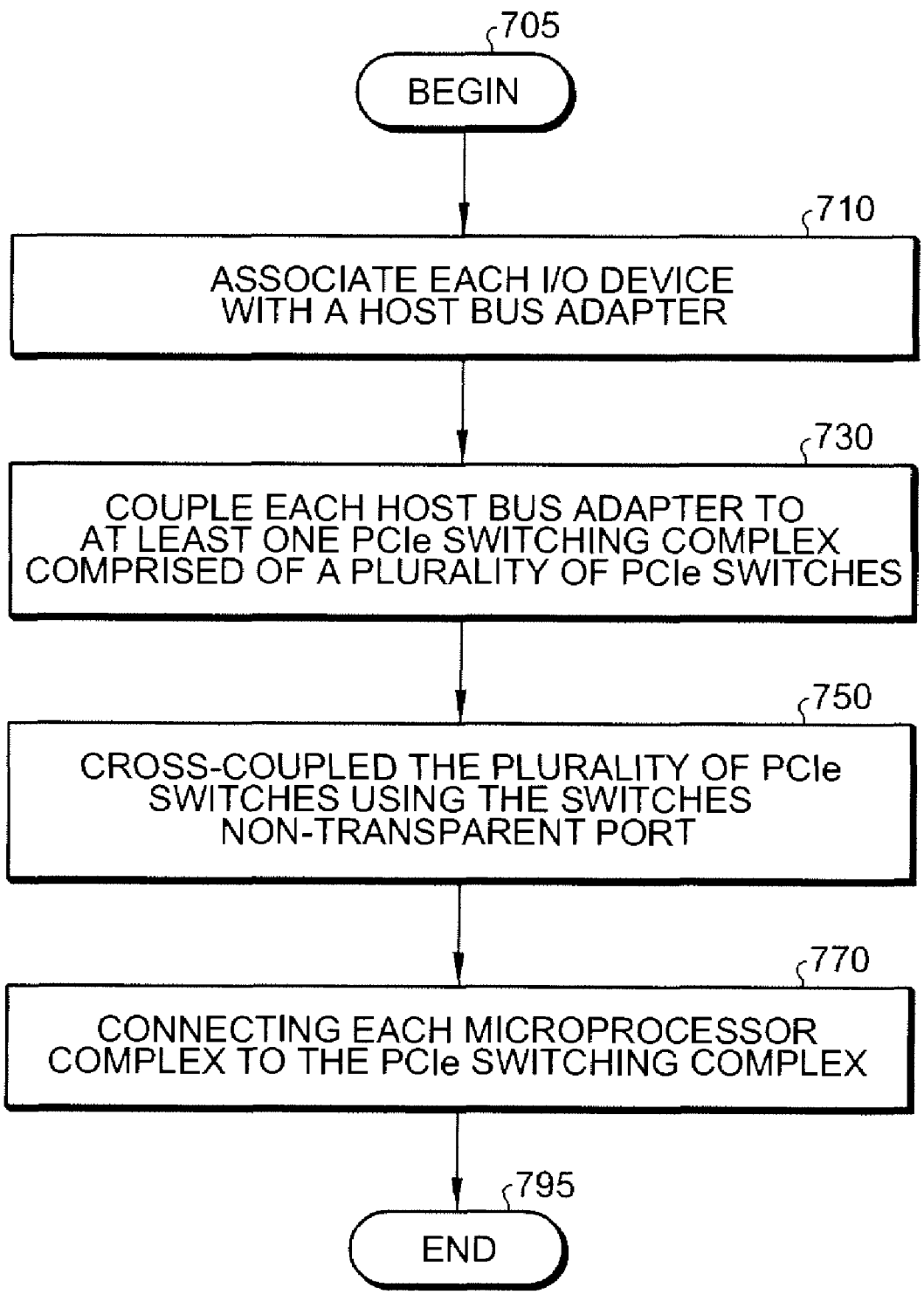
FIG. 7 shows a high level flow diagram for one method embodiment, according to the present invention, for cross-coupled peripheral component interconnect express switches via non-transparent ports.

FIG. 7 is a flow chart showing one exemplary high level embodiment of a method for cross-coupling PCIe switches using non-transparent ports. As illustrated in the previous figures, a plurality of I/O devices are coupled to a plurality of microprocessor complexes via a PCIe switching complex. The PCIe switching complex is comprised of a plurality of PCIe switches cross-coupled via non-transparent ports. Each I/O device is associated 710 with a HBA in one or more HBA sets. The HBA is thereafter coupled 730 to at least one PCIe switch complex having a plurality of PCIe switching. The PCIe switches in the complex are cross-coupled 750 to each other via the switch's non-transparent port. Ultimately the PCIe switch complex is coupled 770 to each microprocessor complex providing multiple paths between any I/O device and any microprocessor complex.

One embodiment of the present invention utilizes the versatility of PCIe switches by creating a cross-coupled switching complex via each PCIe switch's non-transparent port. By cross-coupling a plurality of PCIe switches via each switch's non-transparent port, each I/O device is provided with multiple paths to each microprocessor complex. Using an address range that identified each microprocessor complex to each I/O device, direct memory access to any microprocessor complex can be achieved by any I/O device without being constrained by ownership or blocking issues normally associated with previous forms of redundant access. When a HBA is ready to send data that it is about to receive from an I/O device to a microprocessor complex, the direct memory address, as described above, provides the HBA with the path by which the data should pass. The HBA, therefore, can move data to other microprocessor complexes to provide a more efficient computing system. Application of the cross-coupled PCIe switching complex of one embodiment of the present invention additionally reduces memory management costs as well as latency and overhead. Furthermore, the amount of buffering is reduced, which also reduces latency and processor overhead. The cross-coupling of a plurality of PCIe switches via each switch's non-transparent port also results in the ownership of the HBAs to be distributed across the microprocessor complexes. This minimizes the number of HBAs that each individual microprocessor must own.

As will be understood by those familiar with the art, the invention may be embodied in other specific forms without departing from the spirit or essential characteristics thereof. Likewise, the particular naming and division of the complexes, managers, functions, systems, engines, layers, features, attributes, methodologies and other aspects are not mandatory or significant, and the mechanisms that implement the invention or its features may have different names, divisions and/or formats. Furthermore, as will be apparent to one of ordinary skill in the relevant art, the complexes, managers, functions, systems, engines, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

We claim:

1. A computer system for cross coupling Input/Output devices with microprocessor complexes using peripheral component interconnect express switches, the computer system comprising:
a plurality of microprocessor complexes;
a plurality of Input/Output devices; and
at least one switching complex comprising a plurality of peripheral component interconnect express switches wherein each peripheral component interconnect express switch includes at least two ports, at least one of the two ports being a non-transparent port, wherein the at least one switching complex is configured to couple each Input/Output device with each microprocessor complex through at least two independent paths such that each Input/Output device remains communicatively coupled to each microprocessor complex when one of the at least two independent paths is inoperative, and wherein at least one of the independent paths between each Input/Output device and each microprocessor complex includes at least one non-transparent port.

2. The computer system of claim 1, further comprising a set of host bus adapters interposed between the switching complex and the plurality of Input/Output devices wherein ownership of each host bus adapter is distributed across the plurality of microprocessor complexes.

3. The computer system of claim 2, further comprising a software portion configured to establish address based routing between each microprocessor complex and each Input/Output device via the at least one switching complex.

4. The computer system of claim 3, wherein the address based routing uses the at least one non-transparent port of each peripheral component interconnect express switch to create an address range static map between each microprocessor complex and each Input/Output device.

5. The computer system of claim 1, wherein the plurality of microprocessor complexes includes a first microprocessor complex and a second microprocessor complex, and wherein the at least one switching complex includes a first peripheral component interconnect express switch associated with the first microprocessor complex and a second peripheral component interconnect express switch associated with the second microprocessor complex, and wherein the at least one non-transparent port of the first peripheral component interconnect express switch cross-couples the first peripheral component interconnect express switch to the second microprocessor complex and the at least one non-transparent port of the second peripheral component interconnect express switch cross-couples the second peripheral component interconnect express switch to the first microprocessor complex.

6. The computer system of claim 1, wherein each Input/Output device is associated with at least one host bus adapter and wherein the at least one host bus adapter is associated with the at least one switching complex.

7. The computer system of claim 6, wherein each host bus adapter can access each microprocessor complex via the at least one switching complex.

8. The computer system of claim 1, further comprising a network interface card interposed between a network and the at least one switching complex.

9. A computer system for cross coupling Input/Output devices with microprocessor complexes using peripheral component interconnect express switches, the computer system comprising:
    a plurality of microprocessor complexes;
    a plurality of Input/Output devices;
    a plurality of peripheral component interconnect express switches, each switch having at least one non-transparent port and at least one other port that are configured to cross couple each microprocessor complex to each Input/Output device through at least two independent paths such that each Input/Output device remains communicatively coupled to each microprocessor complex when one of the at least two independent paths is inoperative; and
    a software portion configured to establish address based routing between each microprocessor complex and each Input/Output complex using the at least one non-transparent port cross-coupling of each peripheral component interconnect express switch.

10. The computer system of claim 9, further comprising a plurality of host bus adapter sets interposed between the Input/Output devices and the plurality of peripheral component interconnect express switches, wherein each host bus adapter set includes at least one host bust adapter associated with each Input/Output device and wherein ownership of each host bus adapter is distributed across the plurality of microprocessor complexes.

11. The computer system of claim 10, wherein each host bus adapter can access each microprocessor complex.

12. The computer system of claim 9, further comprising a network interface card interposed between a network and the plurality of peripheral component interconnect express switches.

13. The computer system of claim 9, wherein the software portion configured to establish address based routing between each microprocessor complex and each Input/Output device creates a static address routing map between each microprocessor complex and each Input/Output device.

14. A computer implemented method for cross coupling Input/Output devices with microprocessor complexes, the method comprising:
    associating each of a plurality of Input/Output devices with a host bus adapter set, wherein the host bus adapter set includes a plurality of host bus adapters and wherein at least one host bus adapter of each host bus adapter set is associated with each of the plurality of Input/Output devices;
    coupling each host bus adapter with at least one switching complex, wherein the at least one switching complex comprises a plurality of peripheral component interconnect express switches each having at least one non-transparent port; and
    connecting the at least one switching complex with a plurality of microprocessor complexes, wherein the at least one switching complex is configured to provide each host bus adapter independent access to each microprocessor complex.

15. The computer implemented method of claim 14, further comprising establishing addressed based routing between each microprocessor complex and each Input/Output device via the at least one switching complex, and cross coupling the plurality of peripheral component interconnect express switches using each switch's non-transparent port.

16. The computer implemented method of claim 15, wherein establishing address based routing uses non-transparent ports of the peripheral component interconnect express switches to create an address range static map between each microprocessor complex and each Input/Output device.

17. The computer implemented method of claim 16, wherein establishing address based routing balances access between each Input/Output device and each microprocessor complex.

18. The computer implemented method of claim 14, wherein associating includes associating a plurality of Input/Output devices with a network interface card, wherein the network interface card is associated with each of the plurality of Input/Output complexes.

19. The computer implemented method of claim 14, wherein the plurality of microprocessor complexes includes a first microprocessor complex and a second microprocessor complex, and wherein the at least one switching complex includes a first peripheral component interconnect express switch associated with the first microprocessor complex and a second peripheral component interconnect express switch associated with the second microprocessor complex, and wherein the at least one non-transparent port of the first peripheral component interconnect express switch cross-couples the first peripheral component interconnect express switch to the second microprocessor complex and the at least one non-transparent port of the second peripheral component interconnect express switch cross-couples the second peripheral component interconnect express switch to the first microprocessor complex, the cross-coupling between independent of each other.

20. The computer implemented method of claim 14, wherein each host bus adapter can access each microprocessor complex via the at least one switching complex.

* * * * *